UNITED STATES PATENT OFFICE.

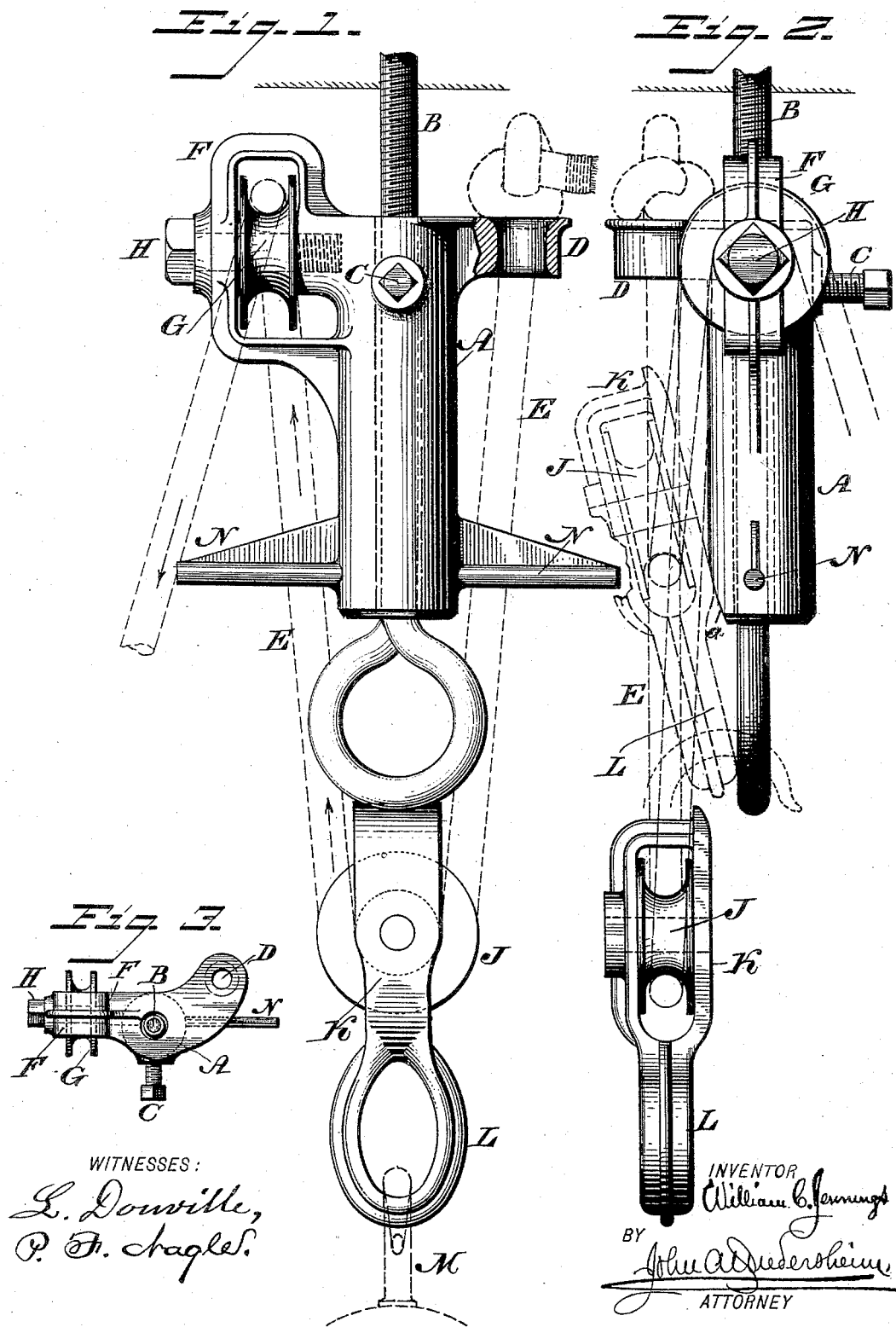

WILLIAM C. JENNINGS, OF CAMDEN, NEW JERSEY, ASSIGNOR TO THE JENNINGS MACHINE COMPANY, OF NEW JERSEY.

SUSPENSION DEVICE.

SPECIFICATION forming part of Letters Patent No. 489,638, dated January 10, 1893.

Application filed April 25, 1892. Serial No. 430,480. (No model.)

*To all whom it may concern:*

Be it known that I, WILLIAM C. JENNINGS, a citizen of the United States, residing in the city and county of Camden, State of New Jersey, have invented a new and useful Improvement in Suspension Devices having Hooking Apparatus Therefor, which improvement is fully set forth in the following specification and accompanying drawings.

My invention consists of a suspension device for a hoisting apparatus, block and tackle, &c., the same being constructed of a body adapted to be secured to a ceiling, beam, &c., an eye on the body for the attachment of a rope or chain, and a pulley on the body over which said rope or chain may be moved, as will be hereinafter more fully set forth.

It also consists of a hooking device, the same having a frame in which is journaled a pulley, and from which frame depends an eye.

Figures 1 and 2 represent side elevations at a right angle to each other, of a suspension device embodying my invention. Fig. 3 represents a plan view of said device on a reduced scale.

Similar letters of reference indicate corresponding parts in the several figures.

Referring to the drawings:—A designates the frame or body of the device, the same being of tubular form, and having passed through the same the screw B, which may be secured to a ceiling, beam or other place overhead, said body having a set screw C passed through the same, and adapted to be tightened against the screw B, thus sustaining the body in adjusted position thereon, the body A being beveled at *a*, as will be hereinafter described.

D designates an eye which is formed on the body A, and through which one end of the rope E is passed for connecting it with said body, as shown by the dotted lines. The body is also formed with a yoke F, which is preferably opposite to the eye D, and has a pulley G supported therein, the axial pin, bolt or screw H of said pulley being connected with the side of said yoke and the adjacent portion of the body A, the pulley thus being firmly sustained on the body. The walls of the said eye D are curved in a horizontal direction see Fig. 3.

K designates the frame of the hooking apparatus, said frame having the pulley J journaled therein and having the eye L depending therefrom. The rope E, after being connected with the eye D, is passed around the pulley G, and forms a loop on which the pulley J is supported. The hook M of a hoisting device, a block and tackle or other article to be suspended may be attached to the eye L, it being evident that the latter may be lowered to effect this attachment, and then raised as the head of the frame K reaches the lower part of A, the slight incline *a* causes the frame K to slide on the same.

As the hook extends somewhat beyond the line of the body K, the said hook touches in the ascent the eye of the said bolt, and the hooking apparatus is pushed back until the point of the hook is reached when said point enters the eye. The rope is now released, the hook engages the eye, and the block, &c., are held securely in place. When it is desired to remove the hook, the frame K is raised slightly, the hook is released from the eye, and the said frame may be lowered in order to disconnect the hook M, after which the frame and eye may be raised and be held until they are again required for service. The body A and connected parts remaining a fixture on the ceiling, beam, &c., to which they are secured.

From the bottom of the body A, there project the laterally extending cleats N, forming with the top portions a spool on which the rope may be coiled or wound.

Having thus described my invention, what I claim as new, and desire to secure by Letters Patent, is:—

1. A suspension device consisting of a body, an eye and a yoke thereon, a pulley mounted in said yoke, a screw passed through said body for attachment to a ceiling, beam, &c. and having an eye on its lower end, and a hooking apparatus with a frame having a pulley journaled therein and a depending eye, substantially as described.

2. In a suspension device substantially as described, a body of tubular form, a securing screw and another screw passed through said body and adapted to tighten against said securing screw, and a hooking apparatus with a frame having a pulley journaled therein, and a depending eye, as stated.

3. A suspension device consisting of a tubular body having an eye and a yoke on opposite sides at one end, cleats projecting from the other end, a pulley journaled in said yoke, a securing screw adjustably secured in said tubular body, said body having a beveled lower end, said parts being combined substantially as described.

WILLIAM C. JENNINGS.

Witnesses:
JOHN A. WIEDERSHEIM,
WM. C. WIEDERSHEIM.